(12) United States Patent
Quiring et al.

(10) Patent No.: US 11,092,132 B2
(45) Date of Patent: Aug. 17, 2021

(54) METHOD OF MANUFACTURING A WIND TURBINE BLADE

(71) Applicant: LM WP PATENT HOLDING A/S, Kolding (DK)

(72) Inventors: Peter Quiring, Rodding (DK); Michael Schafer, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 791 days.

(21) Appl. No.: 14/902,024

(22) PCT Filed: Jul. 10, 2014

(86) PCT No.: PCT/EP2014/064859
§ 371 (c)(1),
(2) Date: Dec. 30, 2015

(87) PCT Pub. No.: WO2015/004257
PCT Pub. Date: Jan. 15, 2015

(65) Prior Publication Data
US 2016/0312762 A1  Oct. 27, 2016

(30) Foreign Application Priority Data
Jul. 12, 2013 (EP) .................... 13176339

(51) Int. Cl.
*F03D 1/06* (2006.01)
*B29C 33/30* (2006.01)
(Continued)

(52) U.S. Cl.
CPC .......... *F03D 1/0633* (2013.01); *B29C 33/306* (2013.01); *B29C 70/34* (2013.01);
(Continued)

(58) Field of Classification Search
CPC ........ F03D 1/0633; F03D 1/0675; F03D 1/06; B29C 33/306; B29C 33/30; B20C 70/34;
(Continued)

(56) References Cited

U.S. PATENT DOCUMENTS 5,824,249 A * 10/1998 Leitch .................... B29C 33/306
264/219
7,530,168 B2 * 5/2009 Sorensen ................ B29C 70/86
29/889.21
(Continued)

FOREIGN PATENT DOCUMENTS

EP  1310351 A1  5/2003
EP  1880833 A1  1/2008
(Continued)

*Primary Examiner* — Igor Kershteyn
*Assistant Examiner* — Joshua R Beebe
(74) *Attorney, Agent, or Firm* — Nath, Goldberg & Meyer; Jerald L. Meyer; Tanya E. Harkins

(57) ABSTRACT

A method and mould system for manufacturing at least a root section of a wind turbine blade is described. The method and system utilise a mould inlay which is arranged on top of a mould surface of a mould part so as to change the radius of curvature of the mould part and thereby also the diameter of a root section manufactured via the mould part and mould inlay. Further, blades manufactured via the method and mould system are described.

13 Claims, 5 Drawing Sheets

(51) Int. Cl.
*B29D 99/00* (2010.01)
*B29C 70/34* (2006.01)
*B29C 70/44* (2006.01)
*B29L 31/08* (2006.01)
*B29K 63/00* (2006.01)
*B29K 67/00* (2006.01)
*B29K 105/06* (2006.01)

(52) U.S. Cl.
CPC .......... *B29C 70/342* (2013.01); *B29C 70/443* (2013.01); *B29D 99/0028* (2013.01); *F03D 1/0675* (2013.01); *B29K 2063/00* (2013.01); *B29K 2067/00* (2013.01); *B29K 2105/06* (2013.01); *B29L 2031/085* (2013.01); *F05B 2230/21* (2013.01); *F05B 2280/40* (2013.01); *F05B 2280/6003* (2013.01); *Y02E 10/72* (2013.01); *Y02P 70/50* (2015.11)

(58) Field of Classification Search
CPC . B20C 70/342; B20C 70/443; B29K 2063/00; B29K 2067/00; B29K 2105/06; B29L 2031/085
See application file for complete search history.

(56) References Cited

U.S. PATENT DOCUMENTS

| | | | |
|---|---|---|---|
| 2009/0148655 A1* | 6/2009 | Nies | B29C 70/865 428/99 |
| 2009/0252614 A1* | 10/2009 | Schibsbye | B23C 3/12 416/248 |
| 2011/0115127 A1* | 5/2011 | Breest | B29C 33/306 264/279 |
| 2011/0135490 A1* | 6/2011 | B | F03D 1/0658 416/241 R |
| 2011/0254189 A1* | 10/2011 | Doyle | B28B 7/346 264/101 |
| 2011/0318186 A1* | 12/2011 | Kristensen | F03D 1/0658 416/219 R |

FOREIGN PATENT DOCUMENTS

| | | |
|---|---|---|
| EP | 2153964 A1 | 2/2010 |
| EP | 2316629 A1 | 5/2011 |
| FR | 2953754 A1 | 6/2011 |
| WO | 9731771 A1 | 9/1997 |
| WO | 2008020158 A2 | 2/2008 |
| WO | 2012122262 A2 | 9/2012 |

* cited by examiner

METHOD OF MANUFACTURING A WIND TURBINE BLADE

This is a National Phase Application filed under 35 U.S.C. 371 as a national stage of PCT/EP2014/064859, filed Jul. 10, 2014, an application claiming the benefit of European Application No. 13176339.3, filed Jul. 12, 2013, the content of each of which is hereby incorporated by reference in its entirety.

The present invention relates to a method of manufacturing at least a root section of a wind turbine blade by use of a mould inlay. The invention further relates to a mould part for manufacturing at least a root section of a wind turbine blade and adapted for use via mould inlays. The invention additionally relates to a kit of parts comprising a mould part for manufacturing at least a root section of a wind turbine blade and mould inlays adapted for insertion in the mould. Finally, the invention also relates to wind turbine blades manufactured via the mould and mould inlays as well as blade series comprising blades manufactured with and without the mould inlays.

Over the years, the construction of blades for wind turbines has developed towards a shape, where the blade (when mounted on the wind turbine) consists of a root area closest to a hub of the wind turbine, a profiled area or airfoil area furthest away from the hub and a transition area between the root area and the airfoil/profiled area. The airfoil area has an ideal or almost ideal blade shape, whereas the root area has a substantially circular cross-section, which reduces the loads from gusts of air and makes it easier and safer to mount the blade to the hub. The root area diameter is often substantially constant along the entire root area. As is suggested by the name, the transition area has a shape gradually changing from the circular shape of the root area to the airfoil profile of the airfoil area. Typically, the width of the transition area increases with increasing distance from the hub.

Wind turbine customers have different demands to the size and functionality of the wind turbine depending on the intended use and the intended place of operation.

Therefore, the demands to the size, such as length and solidity, as well as functionality, such as lift and drag coefficients, of wind turbine blades also vary greatly. Consequently, manufacturers of wind turbine blades need to have a large number of different moulds for producing the wind turbine blades, which are typically manufactured as a shell member of fibre-reinforced polymer. Nonetheless, one aerodynamic design may be used for a number of different wind turbine types. However, the different wind turbine manufacturers may still have different demands for the mounting of the wind turbine blades to the hub of the wind turbines including demands for the diameter of the blade and the blade adapter. Accordingly, each blade including the blade root needs to be custom made for the particular wind turbine manufacturer.

Vacuum infusion or VARTM (vacuum assisted resin transfer moulding) is one method, which is typically employed for manufacturing composite structures, such as wind turbine blades comprising a fibre reinforced matrix material. During the manufacturing process, liquid polymer, also called resin, is filled into a mould cavity, in which fibre material priorly has been inserted, and where a vacuum is generated in the mould cavity hereby drawing in the polymer. The polymer can be thermoset plastic or thermoplastics. Typically, uniformly distributed fibres are layered in a first rigid mould part, the fibres being rovings, i.e. bundles of fibre bands, bands of rovings or mats, which are either felt mats made of individual fibres or woven mats made of fibre rovings. A second mould part, which is often made of a resilient vacuum bag, is subsequently placed on top of the fibre material and sealed against the first mould part in order to generate a mould cavity. By generating a vacuum, typically 80 to 95% of the total vacuum, in the mould cavity between the first mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases the polymer applied is polyester or epoxy, and the fibre reinforcement is most often based on glass fibres or carbon fibres.

During the process of filling the mould, a vacuum, said vacuum in this connection being understood as an underpressure or negative pressure, is generated via vacuum outlets in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus dry spots are areas where the fibre material is not impregnated, and where there can be air pockets, which are difficult or impossible to avoid by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

Often the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

Resin transfer moulding (RTM) is a manufacturing method, which is similar to VARTM. In RTM the liquid resin is not drawn into the mould cavity due to a vacuum generated in the mould cavity. Instead the liquid resin is forced into the mould cavity via an overpressure at the inlet side.

Prepreg moulding is a method in which reinforcement fibres are pre-impregnated with a pre-catalysed resin. The resin is typically solid or near-solid at room temperature.

The prepregs are arranged by hand or machine onto a mould surface, vacuum bagged and then heated to a temperature, where the resin is allowed to reflow and eventually cured. This method has the main advantage that the resin content in the fibre material is accurately set beforehand. The prepregs are easy and clean to work with and make automation and labour saving feasible. The disadvantage with prepregs is that the material cost is higher than for non-impregnated fibres. Further, the core material need to be made of a material, which is able to withstand the process temperatures needed for bringing the resin to reflow. Prepreg moulding may be used both in connection with a RTM and a VARTM process.

As for instance blades for wind turbines have become bigger and bigger in the course of time and may now be more than 70 meters long, the impregnation time in connection with manufacturing such blades has increased, as more fibre material has to be impregnated with polymer. Furthermore, the infusion process has become more complicated, as the impregnation of large shell members, such as blades, requires control of the flow fronts to avoid dry spots, said control may e.g. include a time-related control of inlet channels and vacuum channels. This increases the time required for drawing in or injecting polymer. As a result the polymer has to stay liquid for a longer time, normally also resulting in an increase in the curing time. Additionally, the wind turbine industry has grown with nearly exponential rate over the past few decades, thereby increasing the demands for throughput of manufactured wind turbine blades. This increased demand cannot be satisfied by building new factories alone, but also requires that the manufacturing methods are optimised.

Typically, a wind turbine blade is manufactured by use of two separately manufactured shell parts, e.g. the pressure side and suction side of the wind turbine blade, which are subsequently glued together, for instance via use of glue flanges. However, this process entails the need for post processing of the exterior surface of the blade. It may for instance be necessary to treat the wind turbine blades around the bond lines between the two shell parts, e.g. by grinding, polishing and cleaning the blade near the leading edge and/or the trailing edge of the wind turbine blade. It may even be necessary to provide additional fibre material and resin to the wind turbine blade.

It is also possible to manufacture the shell part in one piece via a closed, hollow moulding. Such manufacturing systems are described in for instance EP 1 310 351, and EP 1 880 833. By use of this manufacturing method it may be possible to reduce the necessary post processing steps of the wind turbine blade.

EP 2 316 629 discloses a modular mould system for manufacturing a shell part for a wind turbine blade. The modular mould system may comprise exchangeable root section moulds, such that the root section of a blade may be customised according to a wind turbine manufacturer's needs.

EP 2 153 964 discloses a mould system for manufacturing a wind turbine blade shell in one piece via closed, hollow moulding system.

WO 97/31771 discloses a method for fabricating moulded parts, where interchangeable mould parts are arranged in a common frame. Various combinations of mould parts can be assembled to produce multiple different parts in the common mould frame. In this system entire mould parts need to be exchanged in order to mould the different parts.

WP 2008/020158 discloses a moulding tool with mandrel recesses formed in the surface of a mould for insertion of a mandrel. By choosing different mandrels, it is possible to form different types of parts. In this system the entire mandrel needs to be exchanged in order to form different parts.

FR 2 953 754 discloses a tool equipment for manufacturing a panel in a composite material. The tool equipment comprises a male mould part including a fixed part and a number of removable modules. The tool is utilised for draping a skin in a composite material.

It is an object of the invention to provide a new method of manufacturing at least a root section of a wind turbine blade, and which overcomes or ameliorates at least one of the disadvantages of the prior art or which provides a useful alternative.

This is according to a first aspect of the invention achieved by a method of manufacturing at least a root section of a wind turbine blade, the root section comprising a composite structure with a fibre-reinforced polymer material including a polymer matrix and fibre-reinforcement material. The method comprises the steps of: a) providing at least a first mould part for manufacturing at least a first root section part of said root section, the first mould part having a longitudinal direction and comprising a first mould surface, the first mould surface defining at least a part of an outer surface of said first root section part manufactured in the first mould part, the first mould surface having an end part with a first radius of curvature, b) providing a mould inlay having an outer surface and an inner surface on top of the first mould surface with the outer surface facing the first mould surface such that the mould inlay extends at least from the end part along a longitudinal section of the first mould surface, the mould inlay having an outer surface which at least at the end part has a radius of curvature corresponding to the first radius of curvature and the inner surface has a second radius of curvature being smaller than the first radius of curvature, and wherein the mould inlays comprise a proximal end and a distal end, the mould inlays being arranged so that the proximal end is arranged nearest the end part and the distal end is arranged farthest from the end part, and wherein the distal end of the mould inlay is tapered, c) providing fibre-reinforcement material and fastening means for fastening the root section to a hub of wind turbine on top of the mould inlay and the first moulding surface, and optionally also sandwich core material, d) providing resin to the fibre-reinforcement material, and e) curing the resin in order to form the composite structure.

Accordingly, it is seen that the method relates to the use of mould inlays in order to change the diameter of the connection part of the moulded root section. This means that the same mould can be used to manufacture blades with different root diameters. Thereby, it is possible to customise the blades to the particular wind turbine manufacturer's need with respect to desired bolt circle diameter or the like. The diameter may be varied without having to vary the thickness of the blade shell. Due to the use of a taper section, the external diameter of the blade manufactured via the method and/or the wall thickness of the blade root may also change gradually according to the taper angle.

It is clear that the mould inlays do not become part of the final composite structure or blade. The mould inlays may be provided in sections or modules. Thus, a mould inlay may be divided into a plurality of mould inlay parts in the transverse direction and/or the longitudinal direction. The taper section may for instance be provided as a single piece, and a non-tapered section of the mould inlay may be provided by a single or plurality of longitudinal pieces. Thereby, the total length of the mould inlay may be customised according to the needs.

It is clear that the first mould part is a female mould part and that the first mould surface defines at least a part of the outer surface of the first root section part.

The root section part (or a first root section part) may for instance be the pressure side root section part. In this case a corresponding second root section part may be manufactured, e.g. via a second mould part, so as to provide the suction side root section part. The two parts are later connected, e.g. via adhesive bonding, in order to form the root section of the wind turbine blade.

Typically, the first root section part is manufactured together with the remaining blade shell part. However, it is also possible to manufacture the blade sectionised, such that the root section part or the root section is later connected to the remaining blade shell.

The resin provided (in step d)) may be provided simultaneously with the fibre-reinforcement material (in step c)), if prepregs are used. Alternatively, or in addition thereto, the resin may be injected into the mould so as to wet the fibre-reinforcement material. The composite structure may for instance be manufactured by a Vacuum Assisted Resin Transfer Moulding (VARTM) process. A vacuum bag is preferably arranged on top of the fibre-reinforcement material and sealed against the first mould part in order to form a mould cavity comprising the fibre-reinforcement material and the fastening members. A vacuum source and a resin source are preferably connected to the mould cavity, and the vacuum source is first used to evacuate the mould cavity after which resin is supplied via the resin source and drawn into the mould cavity.

The blade shell is typically made of a fibre reinforced polymer material. The reinforcement fibres may for instance be glass fibres, carbon fibres, aramid fibres, metallic fibres, such as steel fibres, or plant fibres, whereas the polymer for instance may be epoxy, polyester or vinylester.

In one advantageous embodiment, step c) comprises the steps of: c1) providing a number of outer fibre reinforcement layers to form an outer skin, c2) providing a number of fastening members on top of the outer reinforcement layers and optionally a number of intermediate inserts, and c3) providing a number of inner fibre reinforcement layers to form an inner skin. Accordingly, it is seen that the fastening means, e.g. in form of bushings, are disposed around a circular cross-section, optionally with intermediate inlays. The inlays may be formed as retaining wedges that retain the fastening means in the right position.

The tapering angle of the tapering part of the mould inlay is advantageously between 1 and 20 degrees, or between 1 and 10 degrees.

According to another advantageous embodiment, the mould inlay has a length of 50200 centimetres, or 60-175 centimetres, or 70-150 centimetres. In one advantageous embodiment, the mould inlays has a length of approximately 100-110 centimetres. The tapering part advantageously has a length of 20-40 centimetres. The actual length of the tapering part will of course depend on the thickness of the mould inlay (or how much the root diameter should be changed) as well as the tapering angle.

According to yet another variation of the method according to the invention, a first wind turbine blade is manufactured according to one of the aforementioned embodiment, and a second wind turbine blade is manufactured without the use of the mould inlays. In other words, a second wind turbine blade or at least root section part is manufactured skipping the afore-mentioned step b). Accordingly, the second wind turbine blade will have a root section with an exterior diameter being larger than that of the first wind turbine blade. Thereby, two blades having different root section diameters are manufactured.

Accordingly, the second wind turbine blade (or at least a second root section part of a second root section) is manufactured according to the following steps: f) providing at least said first mould part, g) providing fibre-reinforcement material and fastening means for fastening the root section to a hub of wind turbine on top of the first moulding surface (40, 140) only, and optionally also sandwich core material, h) providing resin to the fibre-reinforcement material, and curing the resin in order to form the composite structure. Thus, it is seen that the entire first mould surface of the first mould part defines the outer surface of the second root section part manufactured in the first mould part.

According to a second aspect, the invention also provides a mould part for manufacturing at least a root section part. The mould part has a longitudinal direction and comprising a first mould surface, the first mould surface defining at least a part of an outer surface of said root section part. The mould part comprises a recess formed in the first mould surface at an end part of the first mould surface and having a first radius of curvature. In other words, the mould part comprises a recess, where the radius of curvature is larger than a radius of curvature of the moulding surface just outside the recess. Such a mould part is particularly suited for varying the blade root diameter of a root section part manufactured in the mould. The recess is adapted to receive a mould inlay that changes the mould surface of the mould part from the first radius of curvature to a second radius of curvature, e.g. the radius of curvature of the mould surface just outside the recess. If a wind turbine blade is manufactured via the mould part without the mould inlays, the blade will have a proximal root end section having a larger root diameter than the distal root part.

The recess comprises a distal end farthest from the end part and a proximal end nearest the end part, wherein the recess comprises a tapering part at the distal end, where the radius of curvature gradually changes from a first radius of curvature to a second radius of curvature being smaller than the first radius of curvature. The end sections of the tapering parts may either have sharp transitions or they may be slightly rounded.

Similarly to the afore-mentioned mould inlays, the recess may extend along a longitudinal extent of the mould part, the longitudinal extent having a length of 50-200 centimetres, or 60-175 centimetres, or 70-150 centimetres.

According to a third aspect, the invention also provides a mould part and mould inlay combination. The combination comprises a mould part for manufacturing at least a root section part, the mould part having a longitudinal direction and comprising a first mould surface, the first mould surface defining at least a part of an outer surface of said root section part, the mould part comprising an end part with a mould surface having a first radius of curvature. The combination further comprises a mould inlay comprising an outer surface and an inner surface, the mould inlay being adapted for being arranged on top of the mould surface at the end part of the mould part so as to change a radius of curvature of the mould surface, the outer surface having a radius of curvature corresponding to the first radius of curvature and the inner surface having a second radius of curvature being smaller than the first radius of curvature, and wherein the mould inlays comprise a proximal end and a distal end, the mould inlays being adapted for being arranged so that the proximal end is arranged nearest the end part and the distal end is arranged farthest from the end part, and wherein the distal end of the mould inlay is tapered.

The mould part of the combination may in principle be a conventional mould in combination with the mould inlays according to the invention. In this case, the mould part and mould inlay combination are together used for manufacturing blades, where the root section and the root end has a smaller diameter than the distal root part of the wind turbine blade. However, the mould part is preferably a mould part formed with a recess in the mould surface as the aforementioned mould parts according to the invention.

The mould inlay is substantially semi-circular making the mould inlay particularly suited for being arranged on the mould part for manufacturing a blade shell half, such as the suction side or the pressure side of the blade. The mould inlay may also be circular or tubular, if it is used for a closed moulding setup, e.g. using outer mould parts and an inner mould core in order to mould the shell as an integral part.

The mould inlay may for instance be made of a foamed polymer or a fibre-reinforced polymer, but the inlay may in principle be made of any suitable material, such as a metal. In one embodiment, the mould inlay is covered with a release wax so that the moulded object can be de-moulded from the mould part.

In one embodiment, a first mould part is used for manufacturing a pressure side of the root section. The corresponding mould inlay may thus be a pressure side mould inlay. A second mould part may be used for manufacturing a suction side of the root section. Similarly, a corresponding mould inlay may thus be a suction side mould inlay.

According to a fourth aspect, the invention also provides a wind turbine blade comprising a root section at a root end of the blade and having an outer surface, the root section comprising a root end part proximal to the root end of the blade and a distal part distal to the root end of the blade, the root end part having an first outer diameter, and the distal part having a second outer diameter, the second diameter being smaller than the first diameter. Such a blade may for instance be manufactured by use of the aforementioned mould part having a recess at the root end part of the mould, wherein the wind turbine blade further comprises a taper section or transition section, where the outer diameter is gradually changed from the first outer diameter to the second outer diameter.

The length of the blade is preferably at least 30 metres, or at least 35, 40, 45, or 50 metres. Since the proximal root end part as previously mentioned has a length of approximately 1 metre, it is seen that the proximal root end part extends along less than 5% of the total blade length.

According to a first advantageous embodiment, the blade has a longitudinal direction with a tip end and a root end and a transverse direction, the blade further comprising: a profiled contour including a pressure side and a suction side, as well as a leading edge and a trailing edge with a chord having a chord length extending there between, the profiled contour, when being impacted by an incident airflow, generating a lift, wherein the profiled contour is divided into: the root section having a substantially circular or elliptical profile closest to the root end, an airfoil section having a lift-generating profile farthest away from the root end, and optionally a transition section between the root section and the airfoil section, the transition section having a profile gradually changing in the radial direction from the circular or elliptical profile of the root section to the lift-generating profile of the airfoil section. Thus, the root section comprises the root end part with the first outer diameter as well as a second root section part having the second outer diameter. Typically, the blade further comprises a shoulder having a shoulder width and located at the boundary between the transition section and the airfoil section.

According to a fifth aspect, the invention also provides a blade series comprising at least a first blade and a second blade. The first blade comprises a first root end section with a first root end part having a first outer diameter, and a first outboard blade part. The second blade comprises a second root end section with a second root end part having a second outer diameter, and a second outboard blade part. The first outboard blade part is identical to the second outboard blade part, and the second outer diameter is smaller than the first outer diameter. In other words, the blade series comprises different types of blades having identical outboard parts but with root end parts having different outer diameters and accordingly also fastening members disposed along different diameters. The first blade corresponds to a blade manufactured in a mould without the mould inlay(s), and the second blade corresponds to a blade manufactured in a mould with the mould inlay(s).

According to an advantageous embodiment, the first blade has a first length and the second blade a second length, the first length being substantially identical to the second blade length. Preferably the first and the second blade have identical airfoil sections. If the blades are provided with transition sections between the root sections and the airfoil sections, the transition sections are preferably also identical.

According to another advantageous embodiment, the first outboard part and the second outboard part extend along at least 80% of a first blade length of the first blade and a second blade length of the second blade length, respectively. The outboard part may also extend along at least 85%, or at least 90% of the first blade length and the second blade length, respectively.

The invention is explained in detail below with reference to an embodiment shown in the drawings, in which FIG. 1 shows a wind turbine, FIG. 2 shows a schematic view of a wind turbine blade, FIG. 3 shows a perspective view of a mould part for use in the invention, FIG. 4 shows a perspective view of a mould part according to the invention, FIG. 5 shows a side view of a lay-up in a mould part according to the invention with a first embodiment of a mould inlay arranged on the mould surface of the mould part, FIG. 6 shows a side view of a lay-up in a mould part according to the invention with a second embodiment of a mould inlay arranged on the mould surface of the mould part, FIG. 7 shows a side view of a lay-up in a mould part according to the invention without a mould inlay arranged on the mould surface of the mould part, FIG. 8 shows a side view of a lay-up in a mould part known per se with a mould inlay arranged on the mould surface of the mould part, FIG. 9 shows a top view of a root section manufactured according to the lay-up of FIG. 5, FIG. 10 shows a top view of a root section manufactured according to the lay-up of FIG. 6 or 7, FIG. 11 shows a top view of a root section manufactured according to the lay-up of FIG. 8, and FIG. 12 shows an end view of a root section part manufactured according to the invention.

FIG. 1 illustrates a conventional modern upwind wind turbine 2 according to the socalled "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8.

FIG. 2 shows a schematic view of a first embodiment of a wind turbine blade 10. The wind turbine blade 10 has the shape of a conventional wind turbine blade and comprises a root section 30 closest to the hub, a profiled or an airfoil section 34 farthest away from the hub and a transition section 32 between the root section 30 and the airfoil section 34. The blade 10 comprises a leading edge 18 facing the direction of rotation of the blade 10, when the blade is mounted on the hub, and a trailing edge 20 facing the opposite direction of the leading edge 18.

The airfoil section 34 (also called the profiled section) has an ideal or almost ideal blade shape with respect to generating lift, whereas the root section 30 due to structural considerations has a substantially circular or elliptical cross-section, which for instance makes it easier and safer to mount the blade 10 to the hub. The diameter (or the chord) of the root section 30 may be constant along the entire root area 30. The transition section 32 has a transitional profile gradually changing from the circular or elliptical shape of the root section 30 to the airfoil profile of the airfoil section 34. The chord length of the transition section 32 typically increases with increasing distance r from the hub. The airfoil section 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition section 32 and the airfoil section 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade 10 comprises a shell structure that defines the aerodynamic structure of the blade 10. The aerodynamic shell may be integrally formed, but often the pressure side and the suction side of the aerodynamic shells are manufactured separately and then later adhered to each other along the leading edge and trailing edge of the shell parts. Accordingly, the root section 30 may also be manufactured by first manufacturing a first root section part 31 and a second root section part. The root section or root section part may be manufactured separately, but typically the root section or root section part will be manufactured integrally with the rest of the blade shell or blade shell part.

FIG. 3 shows a perspective view of the first mould part 40 for manufacturing at least a first root section part 31 according to the invention. The first mould part 40 is designed as a conventional mould part known per se and comprises a mould surface 42, which defines the outer surface of the root section part 31. The mould surface 42 (and thereby also the outer surface of the root section part 31) has a first radius of curvature $R_1$ at an end part 44 of the first mould part 40. The first mould part 40 is rigid, and the root section part is manufactured by use of a vacuum assisted resin transfer moulding (VARTM) process by arranging fibre material and fastening elements in a mould cavity formed between the rigid first mould part 40 and a flexible vacuum bag (not shown), which is sealed against the first rigid mould part, after which a resin is drawn into the mould cavity. Finally, the resin is cured in order to form a composite structure comprising the first root section part 31.

FIG. 4 shows a perspective view of a first mould part 140 according to the invention for manufacturing at least a root section part according to the invention. The first mould part 140 comprises a first mould surface 142, which defines the outer surface of the root section part. The first mould part 140 comprises a recess 143 formed in the first mould surface 142 at an end part 144 of the first mould surface 142. The mould surface 142 is formed so that it has a first radius of curvature $R_1'$ at a part proximal to the end part 144 of the first mould surface 142. The mould surface 142 has a second radius of curvature $R_2'$ at a distal part for manufacturing a distal part of the root section part, the second radius of curvature $R_2'$ being smaller than the first radius of curvature $R_1'$. The recess 143 comprises a tapering part distal to the end part 144 of the first mould surface, where the radius of curvature gradually changes from the first radius of curvature $R_1'$ to the second radius of curvature $R_2'$. The first mould part 140 is rigid, and the root section part is manufactured by use of a vacuum assisted resin transfer moulding (VARTM) process by arranging fibre material and fastening elements, such as bushings, and possibly core material and inserts in a mould cavity formed between the rigid first mould part 140 and a flexible vacuum bag (not shown), which is sealed against the first rigid mould part, after which a resin is drawn into the mould cavity. Finally, the resin is cured in order to form a composite structure comprising the first root section part. If the fibre material is arranged directly on the forming surface, the blade root section manufactured via the first mould part 140 will have a proximal part that has a larger diameter than a distal part of the root section.

FIG. 5 shows a side view of a lay-up in the mould part 140 according to the invention with a first embodiment of a mould inlay 50 arranged on the mould surface 142 of the mould part 140. It is seen that the mould inlay 50 is arranged in the recess 143 of the mould surface 142. The mould inlay has an outer surface 52 facing the mould surface 142 of the mould part 140 and an inner surface 54 facing away from the mould surface 142 of the mould part 140. In the shown embodiment, the outer surface 52 of the mould inlay 50 has a radius of curvature $R_1$ that corresponds to that of the radius of curvature in the recess 143 of the mould surface 142. The inner surface 54 of the mould inlay 50 has a second radius of curvature $R_2$ that corresponds to the radius of curvature $R_2'$ at the distal part for manufacturing the root section part. The mould inlay 50 comprises a tapered wedge part 58 at a distal part of the mould inlay 50 and which follows the tapering part of the recess 143 of the mould surface 142. Accordingly, the radius of curvature with the mould inlay 50 arranged on top of the mould surface 142 is substantially constant along the entire part for manufacturing the root section part. The mould inlay 50 may for instance be semi-circular so as to follow the entire mould surface. However, it is also possible to use a plurality of single mould inlays.

An outer fibre skin 60 comprising a number of fibre layers is arranged on top of the mould inlay 50 and the mould surface 142. Fastening members 64 in form of bushings for fastening the blade to the hub of a wind turbine as well as possible intermediate inserts 66 are arranged on top of the outer fibre skin 60. Further a wedge 65 may be arranged in longitudinal extension of the fastening member. Alternatively, the wedge may be integrally formed with the fastening member. Finally, an inner fibre skin 62 comprising a number of fibre layers is arranged on top of the bushings 64 and the possible intermediate inserts 66.

After the lay-up has been arranged on top of the mould inlay 50 and the mould surface 142, a flexible vacuum bag (not shown) is sealed against the mould part 142, after which a resin is drawn into the mould cavity formed between the mould part 142 and the vacuum bag. Finally, the resin is cured in order to form a composite structure comprising the first root section part.

FIG. 6 shows a side view of a lay-up in a mould part 140 according to the invention with a second embodiment of a mould inlay 150 arranged on the mould surface of the mould part, and wherein like parts are marked with like numerals of the embodiment shown in FIG. 5. Therefore, only the differences between the two embodiments are described. This embodiment differs from the embodiment shown in FIG. 5 in that the mould inlay 150 is thinner and has a larger second radius of curvature so that the mould inlay 150 does not fill out the entire recess 143 of the mould surface 142. Accordingly, a root section part manufactured via the mould part and mould inlay combination will have a proximal root section part that has a larger diameter than the distal root section part. However, the root end part and accordingly also the diameter of the circle along which the fastening members are disposed are changed compared to a root section part manufactured via a lay-up arranged directly on the mould surface 142.

FIG. 7 shows a side view of a lay-up in the mould part 140 according to the invention without a mould inlay arranged on the mould surface 142 of the mould part 140, and wherein like parts are marked with like numerals of the embodiment shown in FIG. 5. This embodiment differs from FIG. 5 in that the outer fibre skin 260, the fastening member 264, and the inner fibre skin 262 are arranged directly on top of the mould surface 142.

FIG. 8 shows a side view of a lay-up in the mould part known per se 40 with a mould inlay 350 arranged on the mould surface 42 of the mould part 40. The mould part 40 and the mould inlay 350 together form a mould part and mould inlay combination according to the invention. The mould inlay 350 is arranged so that an outer surface 352 of the mould inlay 350 faces the mould surface 42 of the mould part 30, and an inner surface 354 of the mould inlay 350 faces away from the mould surface 42 of the mould part 42. The outer surface 352 of the mould inlay 350 has a radius of curvature $R_1$ that corresponds to that of the radius of curvature of the mould surface 142. The inner surface 54 of the mould inlay 50 has a second radius of curvature $R_2$ which is smaller than the first radius of curvature $R_1$. As with the other embodiments, the mould inlay 350 comprises a tapered wedge part at a distal end of the mould inlay 350.

An outer fibre skin 360 comprising a number of fibre layers is arranged on top of the mould inlay 350 and the mould surface 42. Fastening members 364 in form of bushings for fastening the blade to the hub of a wind turbine as well as possible intermediate inserts are arranged on top of the outer fibre skin 360. Finally, an inner fibre skin 364 comprising a number of fibre layers is arranged on top of the bushings 364 and the possible intermediate inserts.

After the lay-up has been arranged on top of the mould inlay 350 and the mould surface 42, a flexible vacuum bag (not shown) is sealed against the mould part 42, after which a resin is drawn into the mould cavity formed between the mould part 42 and the vacuum bag. Finally, the resin is cured in order to form a composite structure comprising the first root section part.

A blade root section manufactured by use of the mould part and mould inlay combination shown in FIG. 8 comprises a proximal root section part having a diameter which is larger than the diameter of the distal root section part.

The mould inlays and recesses as shown in FIGS. 5-8 advantageously have a length of 50-200 centimetres, or 60-175 centimetres, or 70-150 centimetres. In one preferred embodiment, the mould inlays have a length of approximately 100-110 centimetres.

Figure 1:
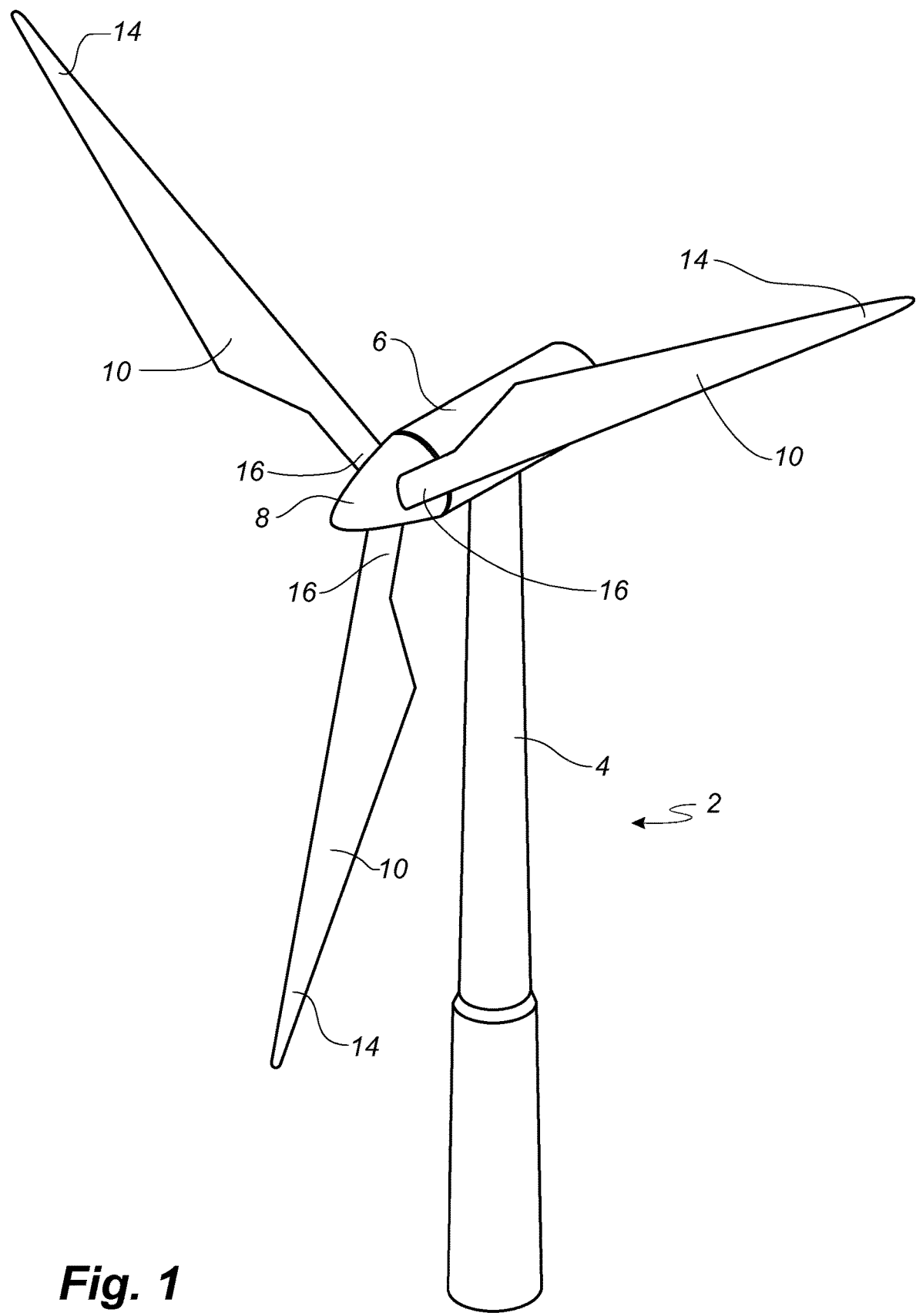
Figure 2:
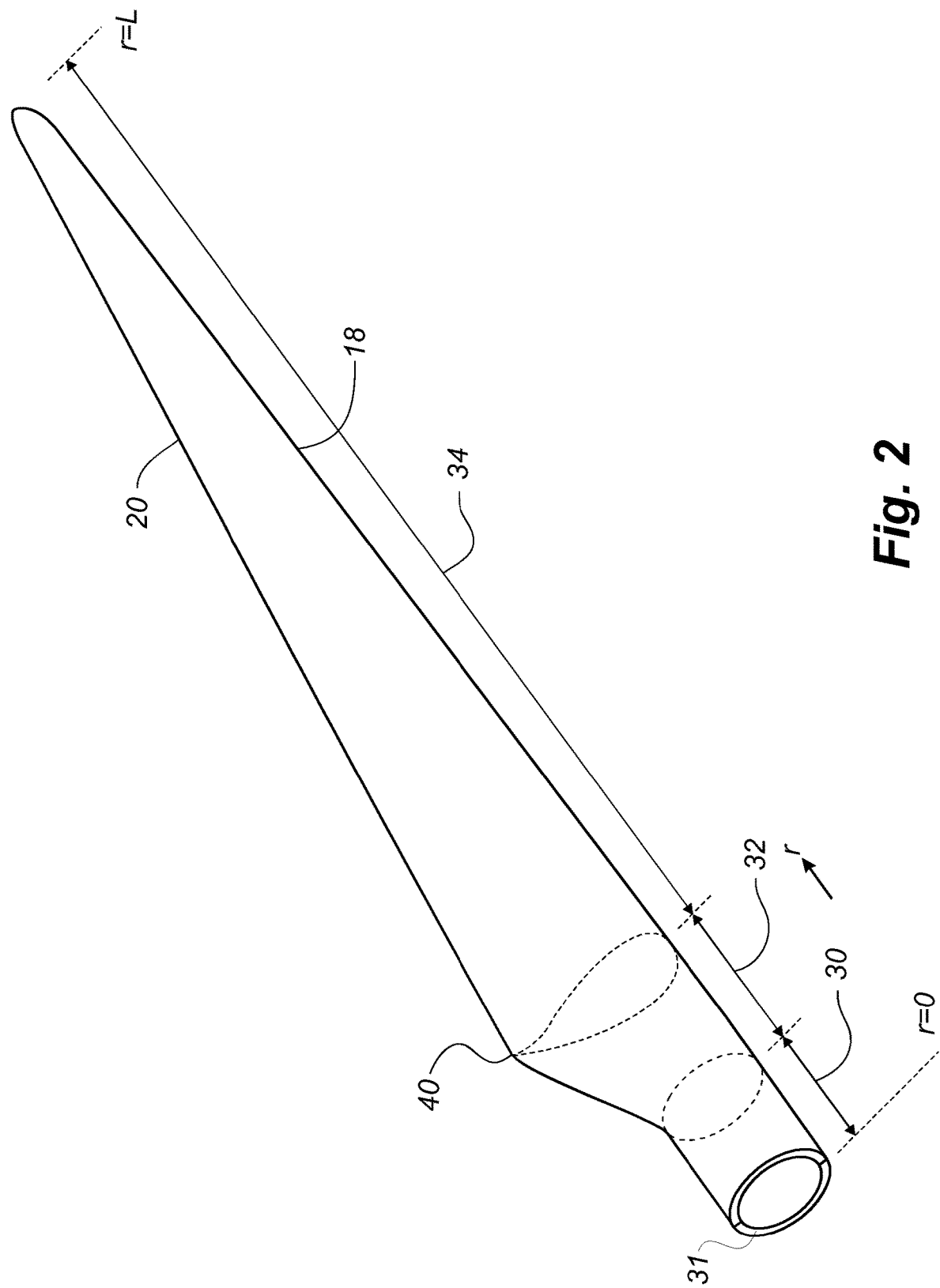
Figure 3:
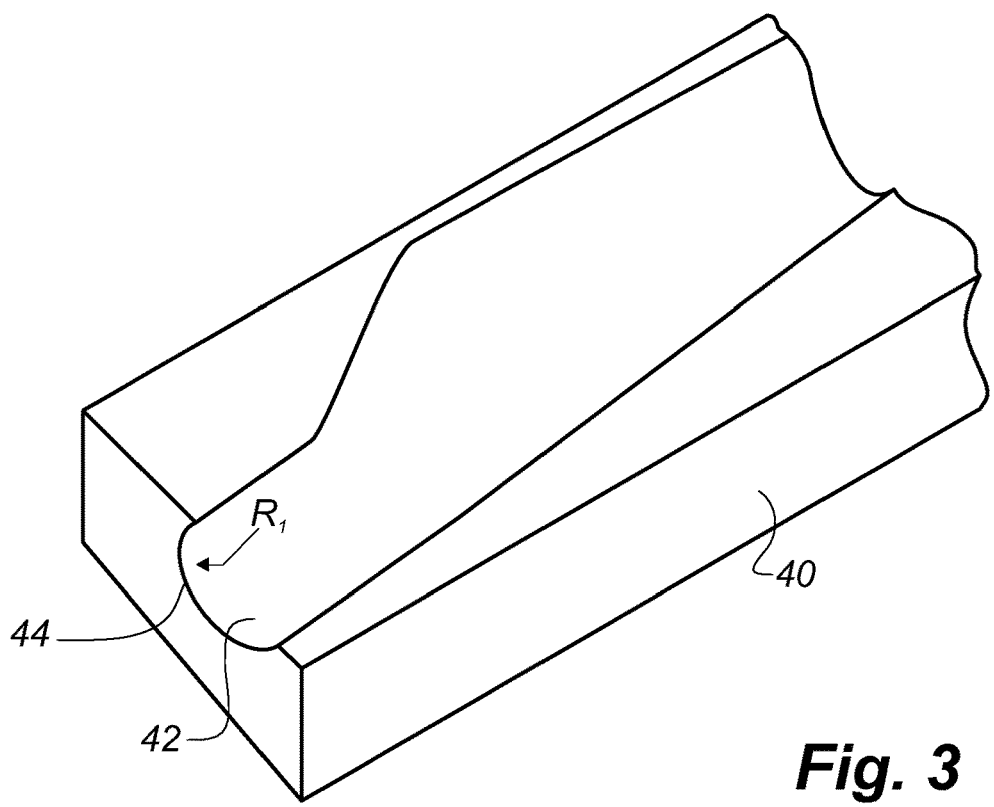
Figure 4:
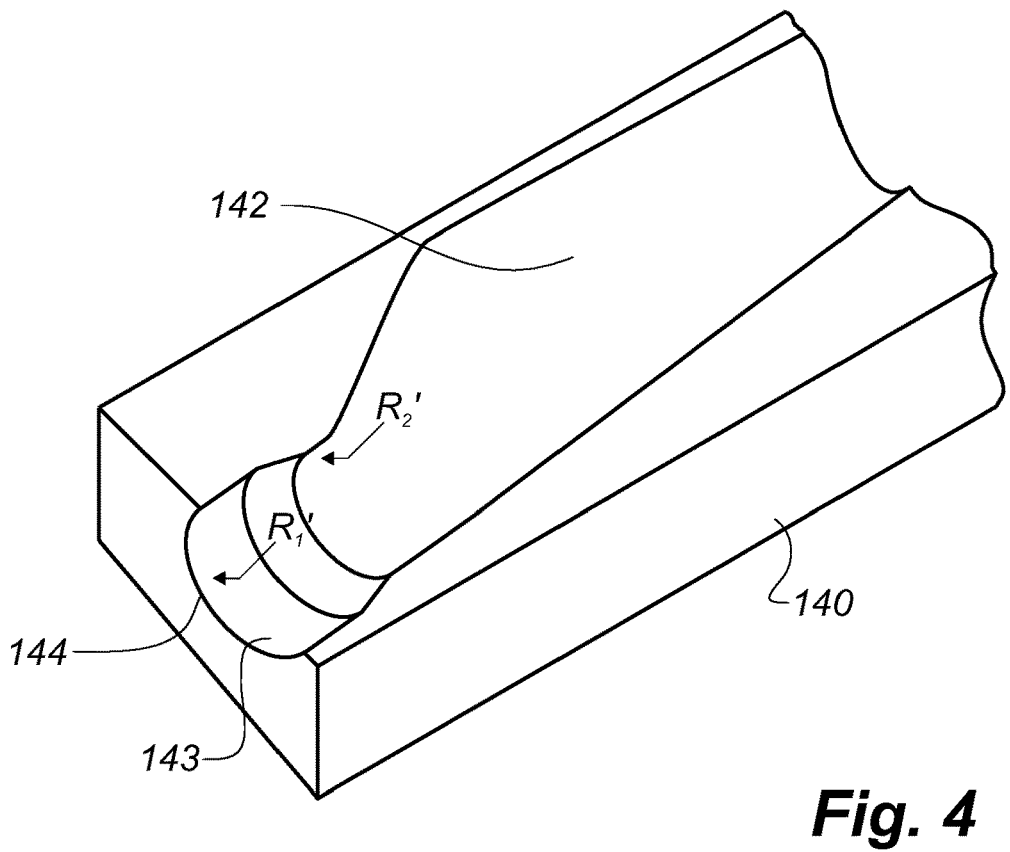
Figure 5:
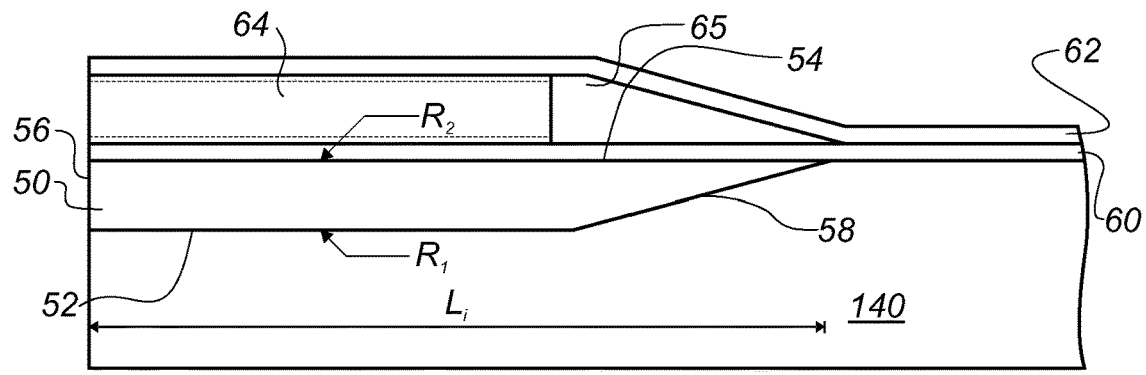
Figure 6:
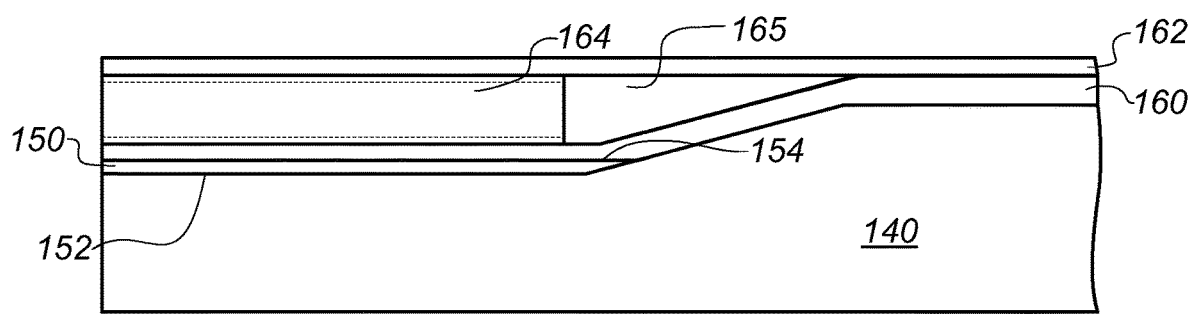
Figure 7:
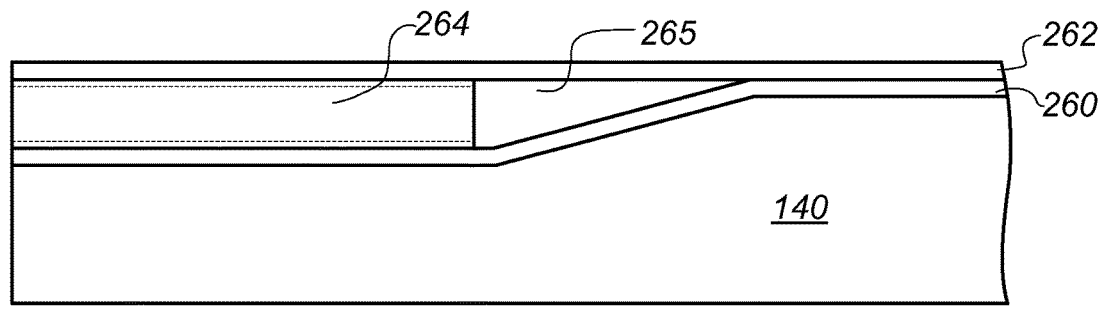
Figure 8:
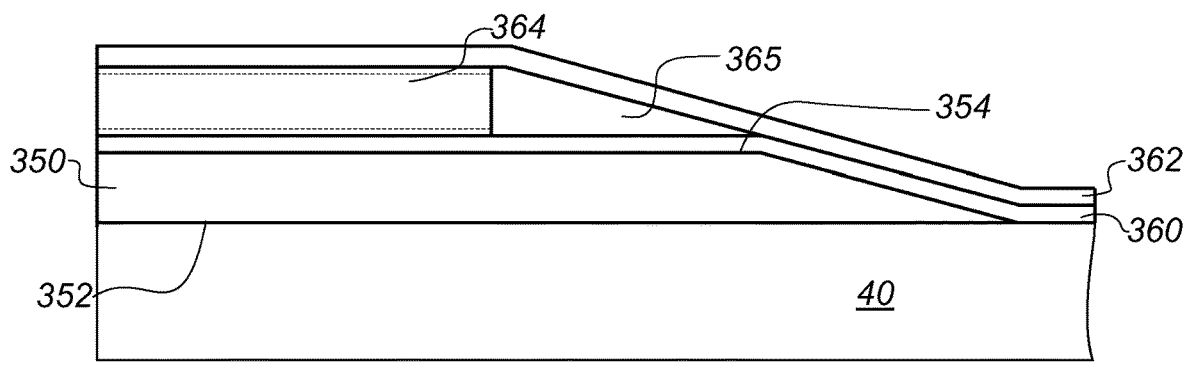
Figure 9:
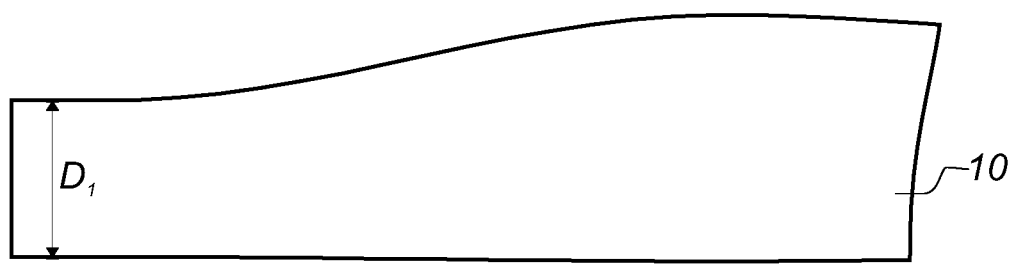
FIG. 9 shows a top view of a blade 10 having a root section manufactured according to the lay-up of FIG. 5. It is seen that such a blade has a conventional shape and corresponds to a blade that would have been manufactured with a mould part without a recess in the mould surface, e.g. via the mould part shown in FIG. 3.
Figure 10:
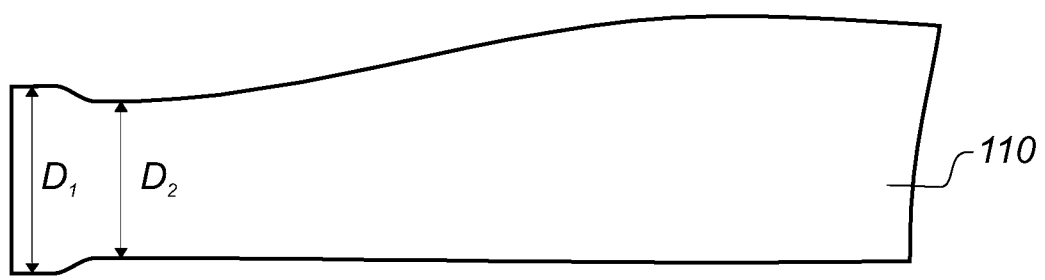
FIG. 10 shows a top view of a root section manufactured according to the lay-up of FIG. 6 or 7. In such an embodiment, the blade comprises a root section having a proximal part with a first diameter $D_1$ and a distal part having a second diameter $D_2$, wherein the first diameter $D_1$ is larger than the second diameter $D_2$.
Figure 11:
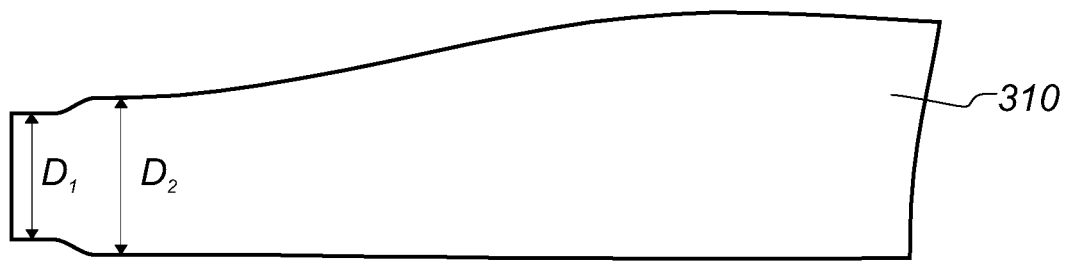
FIG. 11 shows a top view of a root section manufactured according to the lay-up of FIG. 8. In such an embodiment, the blade comprises a root section having a proximal part with a first diameter $D_1$ and a distal part having a second diameter $D_2$, wherein the first diameter $D_1$ is smaller than the second diameter $D_2$.

Accordingly, the invention also provides a series of wind turbine blades according to FIGS. 9-11 having identical outboard parts but with different diameters at a part proximal to the root end. The proximal part preferably extends along less than 5% of the total blade length. In other words, at least 95% of the blade length of the blades in the series is identical.

While blades as shown in FIGS. 10 and 11 may look aesthetically displeasing, the transition in root diameter will not necessarily be seen, when the blade is installed on a wind turbine, since the inner part of the blade may be located within the outer hull of the hub or spinner of the wind turbine.

Figure 12:
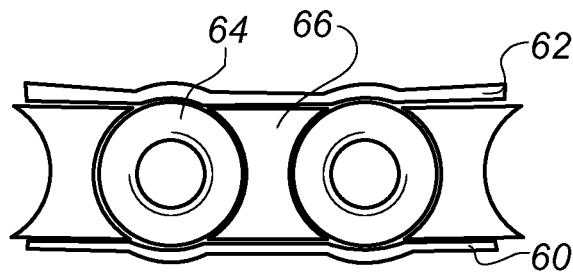

FIG. 12 shows an end view of a root section part manufactured according to the invention. It is seen that the root section part comprises a plurality of fastening members 64 and a plurality of intermediate inserts 66 sandwiched between an outer fibre skin 60 and an inner fibre skin 62. The fastening members 64 are preferably bushings and are accessible from a root end of the blade so that the blade may be mounted to the hub of a wind turbine, e.g. by use of stay bolts.

The intermediate inserts 66 may be made of a fibre-reinforced composite, e.g. in form of a fibre pultrusion. The wedge 65 arranged in longitudinal extension of the bushings 64 may be made of wood or a foamed polymer.

LIST OF REFERENCE NUMERALS 2 wind turbine
4 tower
6 nacelle
8 hub
10, 110, 310 blade
14 blade tip
16 blade root
18 leading edge
20 trailing edge
22 pitch axis
30 root section 32 transition section
34 airfoil section
40, 140 first mould part
42, 142 first mould surface
143 recess
44, 144 end part
50, 150, 250 mould inlay
52, 152, 252 outer surface of mould inlay
54, 154, 254 inner surface of mould inlay
56, 156, 256 proximal end of mould inlay
58, 158, 258 distal end of mould inlay
60, 160, 260, 360 outer fibre skin
62, 162, 262, 362 inner fibre skin
64, 164, 264, 364 fastening member/bushing
65, 165, 265, 365 wedge
66 intermediate insert
r local radius, radial distance from blade root
L blade length
$L_i$ length of mould insert
$R_1$ first radius of curvature
$R_2$ second radius of curvature

The invention claimed is:

1. A method of manufacturing at least a root section (30) of a wind turbine blade (10, 110, 310), the root section (30) comprising a composite structure with a fibre-reinforced polymer material including a polymer matrix and fibre-reinforcement material, the method comprises the steps of:
   a) providing at least a first mould part (40, 140) for manufacturing at least a first root section part (31) of said root section, the first mould part (40, 140) having a longitudinal direction and comprising a first mould surface (42, 142), the first mould surface (42, 142) defining at least a part of an outer surface of said first root section part (31) manufactured in the first mould part (42, 142), the first mould surface (42, 142) having an end part (44, 144) with a first radius of curvature ($R_1$);
   b) providing a mould inlay (50, 150, 250) having an outer surface (52, 152, 252) and an inner surface (54, 154, 254) on top of the first mould surface (42, 142) with the outer surface (52, 152, 252) facing the first mould surface (42, 142) such that the mould inlay (50, 150, 250) extends at least from the end part (44, 144) along a longitudinal section of the first mould surface (42, 142), the mould inlay (50, 150, 250) having an outer surface (52, 152, 154) which at least at the end part (44, 144) has a radius of curvature corresponding to the first radius of curvature ($R_1$) and the inner surface (54, 154, 254) has a second radius of curvature ($R_2$) being smaller than the first radius of curvature ($R_1$), and wherein the mould inlays comprise a proximal end and a distal end, the mould inlays being arranged so that the proximal end is arranged nearest the end part and the distal end is arranged farthest from the end part, and wherein the distal end of the mould inlay is tapered, the second radius of curvature ($R_2$) corresponding to the distal end, and wherein the mould inlay (50, 150, 250) is curved;
   c) providing fibre-reinforcement material (60, 62; 160, 162; 360, 362) and fastening means (64, 164, 264, 364) for fastening a connection part of the root section (30) to a hub of a wind turbine (2) on top of the mould inlay (50, 150, 250) and the first moulding surface (40, 140), and optionally also sandwich core material, wherein the connection part of the root section (30) has a cylindrical contour along an entirety thereof, the connection part of the root section (30) having a radius of curvature equal to the second radius of curvature ($R_2$);
   d) providing resin to the fibre-reinforcement material (60, 62; 160, 162; 360, 362); and
   e) curing the resin in order to form the composite structure.

2. The method according to claim 1, wherein step c) further comprises the steps of:
   c1) providing a number of outer fibre reinforcement layers to form an outer skin;
   c2) providing a number of fastening members on top of the outer reinforcement layers and optionally a number of intermediate inserts; and
   c3) providing a number of inner fibre reinforcement layers to form an inner skin.

3. The method according to claim 1, wherein the mould inlay has a length of 50-200 centimetres.

4. The method according to claim 3, wherein the mould inlay has a length of 60-175 centimetres.

5. The method according to claim 4, wherein the mould inlay has a length of 70-150 centimetres.

6. The method according to claim 1, wherein the tapered distal end has a length of 20-40 centimetres.

7. A first turbine blade manufactured according to the method of claim 1, a second wind turbine blade being manufactured according to the following steps:
   f) providing at least said first mould part (40, 140);
   g) providing fibre-reinforcement material (60, 62; 160, 162; 360, 362) and fastening means (64, 164, 264, 364) for fastening the root section (30) to the hub of the wind turbine (2) on top of the first moulding surface (40, 140) only, and optionally also sandwich core material;
   h) providing resin to the fibre-reinforcement material (60, 62; 160, 162; 360, 362); and
   i) curing the resin in order to form the composite structure.

8. A mould part and mould inlay combination, comprising:
   a mould part (40, 140) for manufacturing at least a root section part, the mould part (40, 140) having a longitudinal direction and comprising a first mould surface (42, 142), the first mould surface (42, 142) defining at least a part of an outer surface of said root section part, the mould part (40, 140) comprising an end part (44, 144) with a mould surface (42, 142) having a first radius of curvature ($R_1$, $R_1'$); and
   a mould inlay (50, 150, 250, 350) comprising an outer surface (52, 152, 252, 352) and an inner surface (54, 154, 254, 354), the mould inlay (50, 150, 250, 350) being adapted for being arranged on top of the mould surface (42, 142) at the end part (44, 144) of the mould part (40, 140) so as to change a radius of curvature of the mould surface (42, 142), the outer surface (52, 152, 252, 352) having a radius of curvature corresponding to the first radius of curvature ($R_1$, $R_1'$) and the inner surface (54, 154, 254, 354) having a second radius of curvature ($R_2$, $R_2'$) being smaller than the first radius of curvature ($R_1$, $R_1'$), and wherein the mould inlays comprise a proximal end and a distal end, the mould inlays being adapted for being arranged so that the proximal end is arranged nearest the end part and the distal end is arranged farthest from the end part, and wherein the distal end of the mould inlay is tapered, the second radius of curvature ($R_2$, $R_2'$) corresponding to the distal end, and wherein the mould inlay (50, 150, 250) is curved.

9. The mould part and mould inlay combination according to claim 8, wherein the mould inlay is substantially semi-circular.

10. The mould part and mould inlay combination according to claim 8, wherein the mould inlay is made of a foamed polymer or a fibre-reinforced polymer.

11. A method of manufacturing at least a root section (30) of a wind turbine blade (10, 110, 310), the root section (30) comprising a composite structure with a fibre-reinforced polymer material including a polymer matrix and fibre-reinforcement material, the method comprises the steps of:
   a) providing at least a first mould part (40, 140) for manufacturing at least a first root section part (31) of said root section, the first mould part (40, 140) having a longitudinal direction and comprising a first mould surface (42, 142), the first mould surface (42, 142) defining at least a part of an outer surface of said first root section part (31) manufactured in the first mould part (42, 142), the first mould surface (42, 142) having an end part (44, 144) with a first radius of curvature ($R_1$);
   b) providing a mould inlay (50, 150, 250) having an outer surface (52, 152, 252) and an inner surface (54, 154, 254) on top of the first mould surface (42, 142) with the outer surface (52, 152, 252) facing the first mould surface (42, 142) such that the mould inlay (50, 150, 250) extends at least from the end part (44, 144) along a longitudinal section of the first mould surface (42, 142), the mould inlay (50, 150, 250) having an outer surface (52, 152, 154) which at least at the end part (44, 144) has a radius of curvature corresponding to the first radius of curvature ($R_1$) and the inner surface (54, 154, 254) has a second radius of curvature ($R_2$) being smaller than the first radius of curvature ($R_1$), and wherein the mould inlays comprise a proximal end and a distal end, the mould inlays being arranged so that the proximal end is arranged nearest the end part and the distal end is arranged farthest from the end part, and wherein the distal end of the mould inlay is tapered, the second radius of curvature ($R_2$) corresponding to the distal end, and wherein the mould inlay (50, 150, 250) is curved;
   c) providing fibre-reinforcement material (60, 62; 160, 162; 360, 362) and fastening means (64, 164, 264, 364) for fastening the root section (30) to a hub of a wind turbine (2) on top of the mould inlay (50, 150, 250) and the first moulding surface (40, 140), and optionally also sandwich core material, wherein the fastening means (64, 164, 264, 364) has a cylindrical contour corresponding to a cylindrical contour of the root section (30);
   d) providing resin to the fibre-reinforcement material (60, 62; 160, 162; 360, 362); and
   e) curing the resin in order to form the composite structure, wherein the distal end of the mould inlay is tapered such that an inner surface of the distal end has a constant radius of curvature equal to the second radius of curvature ($R_2$) and an outer surface of the distal end varies in radius of curvature from a radius of curvature equal to the first radius of curvature ($R_1$) and towards the second radius of curvature ($R_2$).

12. A method of manufacturing at least a root section (30) of a wind turbine blade (10, 110, 310), the root section (30) comprising a composite structure with a fibre-reinforced polymer material including a polymer matrix and fibre-reinforcement material, the method comprises the steps of:
   a) providing at least a first mould part (40, 140) for manufacturing at least a first root section part (31) of said root section, the first mould part (40, 140) having a longitudinal direction and comprising a first mould surface (42, 142), the first mould surface (42, 142) defining at least a part of an outer surface of said first root section part (31) manufactured in the first mould part (42, 142), the first mould surface (42, 142) having an end part (44, 144) with a first radius of curvature (R1);
   b) providing a mould inlay (50, 150, 250) having an outer surface (52, 152, 252) and an inner surface (54, 154, 254) on top of the first mould surface (42, 142) with the outer surface (52, 152, 252) facing the first mould surface (42, 142) such that the mould inlay (50, 150, 250) extends at least from the end part (44, 144) along a longitudinal section of the first mould surface (42, 142), the mould inlay (50, 150, 250) having an outer surface (52, 152, 154) which at least at the end part (44, 144) has a radius of curvature corresponding to the first radius of curvature ($R_1$) and the inner surface (54, 154, 254) has a second radius of curvature ($R_2$) being smaller than the first radius of curvature ($R_1$), and wherein the mould inlays comprise a proximal end and a distal end, the mould inlays being arranged so that the proximal end is arranged nearest the end part and the distal end is arranged farthest from the end part, and wherein the distal end of the mould inlay is tapered, the second radius of curvature ($R_2$) corresponding to the distal end, and wherein the mould inlay (50, 150, 250) is curved;
   c) providing fibre-reinforcement material (60, 62; 160, 162; 360, 362) and fastening means (64, 164, 264, 364) for fastening the root section (30) to a hub of a wind turbine (2) on top of the mould inlay (50, 150, 250) and the first moulding surface (40, 140), and optionally also sandwich core material, wherein the fastening means (64, 164, 264, 364) has a cylindrical contour corresponding to a cylindrical contour of the root section (30);
   d) providing resin to the fibre-reinforcement material (60, 62; 160, 162; 360, 362); and
   e) curing the resin in order to form the composite structure, wherein the distal end of the mould inlay is tapered such that an outer surface of the distal end has a constant radius of curvature equal to the first radius of curvature ($R_1$) and an inner surface of the distal end varies in radius of curvature from a radius of curvature equal to the second radius of curvature ($R_2$) and towards the first radius of curvature ($R_1$).

13. A method of manufacturing at least a root section (30) of a wind turbine blade (10, 110, 310), the root section (30) comprising a composite structure with a fibre-reinforced polymer material including a polymer matrix and fibre-reinforcement material, the method comprises the steps of:
   a) providing at least a first mould part (40, 140) for manufacturing at least a first root section part (31) of said root section, the first mould part (40, 140) having a longitudinal direction and comprising a first mould surface (42, 142), the first mould surface (42, 142) defining at least a part of an outer surface of said first root section part (31) manufactured in the first mould part (42, 142), the first mould surface (42, 142) having an end part (44, 144) with a first radius of curvature ($R_1$);
   b) providing a mould inlay (50, 150, 250) having an outer surface (52, 152, 252) and an inner surface (54, 154, 254) on top of the first mould surface (42, 142) with the outer surface (52, 152, 252) facing the first mould surface (42, 142) such that the mould inlay (50, 150, 250) extends at least from the end part (44, 144) along a longitudinal section of the first mould surface (42, 142), the mould inlay (50, 150, 250) having an outer surface (52, 152, 154) which at least at the end part (44, 144) has a radius of curvature corresponding to the first radius of curvature ($R_1$) and the inner surface (54, 154, 254) has a second radius of curvature ($R_2$) being smaller than the first radius of curvature ($R_1$), and wherein the mould inlays comprise a proximal end and a distal end, the mould inlays being arranged so that the proximal end is arranged nearest the end part and the distal end is arranged farthest from the end part, and wherein the distal end of the mould inlay is tapered, the second radius of curvature ($R_2$) corresponding to the distal end;

c) providing fibre-reinforcement material (60, 62; 160, 162; 360, 362) and fastening means (64, 164, 264, 364) for fastening the root section (30) to a hub of a wind turbine (2) on top of the mould inlay (50, 150, 250) and the first moulding surface (40, 140), and optionally also sandwich core material, wherein the fastening means (64, 164, 264, 364) has a cylindrical contour corresponding to a cylindrical contour of the root section (30);

d) providing resin to the fibre-reinforcement material (60, 62; 160, 162; 360, 362); and e) curing the resin in order to form the composite structure, wherein the mould inlay has a semi-circular contour.

* * * * *

UNITED STATES PATENT AND TRADEMARK OFFICE
CERTIFICATE OF CORRECTION

PATENT NO. : 11,092,132 B2
APPLICATION NO. : 14/902024
DATED : August 17, 2021
INVENTOR(S) : Peter Quiring and Michael Schafer Page 1 of 1

It is certified that error appears in the above-identified patent and that said Letters Patent is hereby corrected as shown below:

In the Claims

In Claim 8, Column 14, Line 59, delete "$(R_I, R'_i)$" and insert therefore:
--$(R_1, R'_1)$--

In Claim 13, Column 17, Line 9, delete "$(R_I)$" and insert therefore:
--$(R_1)$--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*